US010757623B2

(12) United States Patent
Trim et al.

(10) Patent No.: US 10,757,623 B2
(45) Date of Patent: Aug. 25, 2020

(54) COGNITIVE ANALYSIS OF TEMPORAL OBSTRUCTIONS

(71) Applicant: International Business Machines Corporation, Armonk, NY (US)

(72) Inventors: Craig M. Trim, Ventura, CA (US); Gandhi Sivakumar, Bentleigh (AU); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/200,749

(22) Filed: Nov. 27, 2018

(65) Prior Publication Data
US 2020/0169930 A1 May 28, 2020

(51) Int. Cl.
*H04W 36/08* (2009.01)
*H04W 36/30* (2009.01)
*H04W 36/38* (2009.01)
*H04W 16/18* (2009.01)
*H04W 84/04* (2009.01)
*G06K 9/62* (2006.01)
*G06F 40/30* (2020.01)

(52) U.S. Cl.
CPC ........... *H04W 36/08* (2013.01); *H04W 16/18* (2013.01); *H04W 36/30* (2013.01); *H04W 36/385* (2013.01); *G06F 40/30* (2020.01); *G06K 9/6267* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 5,787,344 A | 7/1998 | Scheinert |
| 6,128,470 A | 10/2000 | Naidu et al. |
| 6,950,658 B2 | 9/2005 | Minnick et al. |
| 7,974,241 B2 | 7/2011 | Aaron |
| 9,578,495 B2 | 2/2017 | Xiang et al. |
| 9,668,180 B1 | 5/2017 | Vivanco et al. |
| 9,681,269 B2 | 6/2017 | MacGougan et al. |
| 9,736,757 B2 | 8/2017 | Boss et al. |
| 9,817,125 B2 | 11/2017 | Liu et al. |
| 9,860,336 B2 | 1/2018 | DeLuca et al. |
| 2008/0153472 A1 | 6/2008 | Karstens |

(Continued)

FOREIGN PATENT DOCUMENTS

WO    WO2016141527    9/2016

OTHER PUBLICATIONS

Optimal scheduling of handoffs in cellular networks, M. Asawa; W. E. Stark IEEE/ACM Transaction on Networking, Year: 1996, vol. 4, Issue: 3, pp. 428-441.

(Continued)

*Primary Examiner* — Christine T Duong
(74) *Attorney, Agent, or Firm* — Schmeiser, Olsen & Watts, LLP; Brian Restauro

(57) ABSTRACT

A method, system and computer program product includes receiving information related to a temporal obstruction located within a first small cell of a network, analyzing the information related to the temporal obstruction, determining a change in a range of the first small cell caused by the temporal obstruction, and sending a notification related to the change in the range of the first small cell caused by the temporal obstruction.

20 Claims, 10 Drawing Sheets

(56) References Cited

U.S. PATENT DOCUMENTS

2011/0319025 A1    12/2011  Siomina et al.
2012/0165005 A1*    6/2012  Brend ................. H04W 52/243
                                                         455/422.1
2015/0071248 A1*    3/2015  Faerber ............. H04W 36/0055
                                                          370/331
2018/0213417 A1*    7/2018  Lysejko ................... H01Q 1/02

OTHER PUBLICATIONS

Cell phone QOS predictor, LENOVO, IPCOM000147481D, Mar. 16, 2007, 2 pages.

An analytical model for evaluating outage and handover probability of cellular wireless networks, T. T. Vu; L. Decreusefond; P. Martins, The 15th International Symposium on Wireless Personal Multimedia Communications, Year: 2012, pp. 643-647.

Downlink soft handover gain in CDMA cellular network with cross-correlated shadowing, X. Yang; S. Ghaheri-Niri; R. Tafazolli, IEEE 54th Vehicular Technology Conference. VTC Fall 2001. Proceedings (Cat. No. 01CH37211) Year: 2001, vol. 1, pp. 276-280 vol. 1.

\* cited by examiner

COGNITIVE ANALYSIS OF TEMPORAL OBSTRUCTIONS

TECHNICAL FIELD

The present invention relates to cellular networks. More specifically, the invention relates to systems and methods for detecting and analyzing temporal obstructions in cellular networks.

BACKGROUND

There has been an explosive growth of mobile traffic demand. With the advent of 5G, increased bandwidth and better network capabilities such as lower latency are expected. 5G networks are expected to utilize small cells, such as microcells, picocells or femtocells, to increase bandwidth. Such small cells will be deployed particularly in locations of high bandwidth consumption, such as urban environments. Small cells may utilize millimeter band mmWave communications, for example in the ranges between 2.4 and 5 GHz. These mmWave communications have different properties than traditional cellular communication waves.

SUMMARY

An embodiment of the present invention relates to a method, and associated computer system and computer program product. One or more processors of a computer system receive information related to a temporal obstruction located within a first small cell of a network. The information related to the temporal obstruction is analyzed. A change is determined in a range of the first small cell caused by the temporal obstruction. A notification is sent related to the change in the range of the first small cell caused by the temporal obstruction.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention seeks to sense and determine where temporal (e.g. temporary or non-permanent) obstructions exist, or might exist, within a cellular network. The present invention seeks to utilize this information to provide analysis, suggest changes, or make changes, to cellular networks. Never have temporal obstructions been found, determined, and analyzed for small cell networks in the manner described herein. With the increasing reliance on smaller and smaller network cells with higher sensitivities to blockage in future 5G networks and beyond, the present invention seeks to enable the benefits of new mmWave systems while reducing the impact of the disadvantages known to such systems.

The present invention when implemented is configured to improve cellular network performance. The present invention seeks to overcome existing challenges in implemented small cells and mmWave communications in cellular networks. The present invention is configured to reduce the impact of high propagation loss and sensitivity to blockage that is inherent in mmWave distribution through small cells. The present invention seeks to create a more efficient cellular network through cognitive analysis of temporal obstructions and appropriate planning thereof. Embodiments described herein may be practiced without human intervention—through the automatic analysis and utilization of information systems such as social media platforms, web sites, forums, calendars, applications or other information sources. Embodiments herein may be configured to make predictions, make network changes, and/or suggest network changes, based on analysis conducted.

Figure 1:
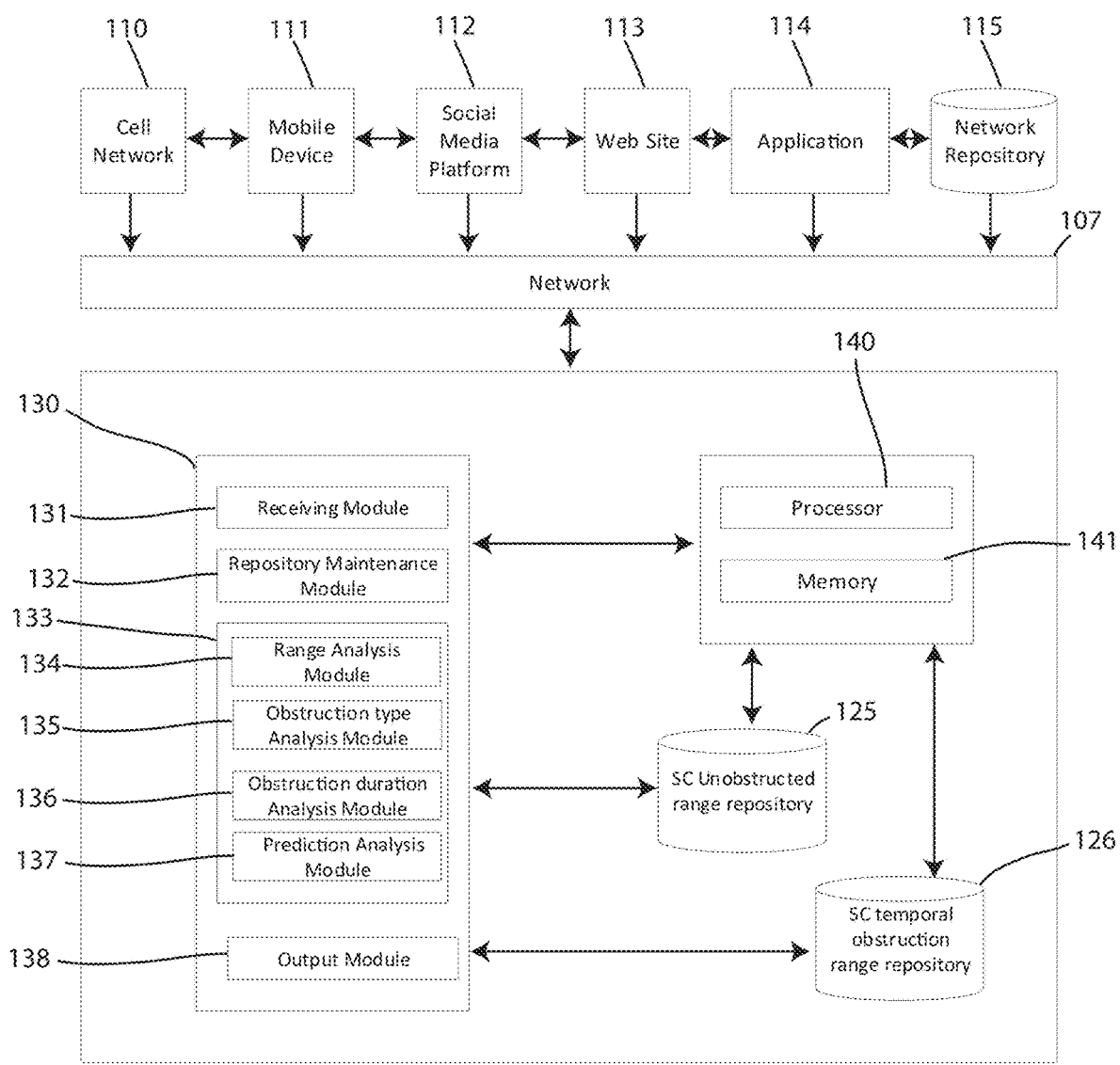
FIG. 1 depicts a block diagram of a system of cognitive analysis of temporal obstructions in a cellular network, in accordance with embodiments of the present invention.

Referring to the drawings, FIG. 1 depicts a block diagram of a system of cognitive analysis of temporal obstructions in a cellular network 100, in accordance with embodiments of the present invention. Embodiments of the system of cognitive analysis of temporal obstructions in a cellular network 100 may be configured to sense or locate temporal obstructions, analyze information related to temporal obstructions to determine potential and actual temporal obstructions. Embodiments of the system of cognitive analysis of temporal obstructions in a cellular network 100 may be configured to further make improvements to a cellular network such as by changing the cell that is providing service to a given mobile device, recommend changes to a cellular network, or actuate changes within a cellular network. Thus, the invention and the system of cognitive analysis of temporal obstructions in a cellular network 100 is not limited to only cognitively analyzing obstructions in a cellular network and may be configured to provide any of the various functionality described herein.

A temporal obstruction may be considered any obstruction that is generally temporary in nature. Examples of temporal obstructions may include construction equipment, traffic, a parade, the erection of a temporary structure, the installation of a banner of flag, weather, a seasonal erected building, or any other temporary obstruction of a cellular network that is likely to have a limited duration that may not be accounted for in the original planning of a cellular network.

The system of cognitive analysis of temporal obstructions in a cellular network 100 is shown including a cellular network 110, a mobile device 111, a social media platform 112, a web site 113, an application 114, and a network repository 115 connected over a network 107 to a computer system 120. Each of the cellular network 110, the mobile device 111, the social media platform 112, the web site 113, the application 114, and the network repository 115 may each represent a plurality or a single one of the given element 110, 111, 112, 113, 114, 115. Some or all of the cellular network 110, the mobile device 111, the social media platform 112, the web site 113, the application 114, and the network repository 115 may be interconnected to others of these devices. While FIG. 1 shows the cellular network 110, the mobile device 111, the social media platform 112, the web site 113, the application 114, and the network repository 115 directly connected to adjacent elements 110, 111, 112, 113, 114, 115, any interconnection (e.g. non-adjacent) of elements 110, 111, 112, 113, 114, 115 is contemplated. Further, while each of the elements 110, 111, 112, 113, 114, 115 are shown as separate features of the system of cognitive analysis of temporal obstructions in a cellular network 100, in some embodiments one or more of the elements 110, 111, 112, 113, 114, 115 may be combined or contain overlapping structure and functionality (e.g. the web site 113 may include functionality or features attributed in the present description to the social media platform 112).

In the embodiment shown, the cellular network 110 is any cellular network. The cellular network 110 may be a small cell densified network and may include a plurality of small cells providing network service. The cellular network 110 may be a metropolitan network located within an urban environment where bandwidth demand is high. The cellular network 110 may include a macro core network that may include one or more mobile switching center servers (MSC's), each connected to one or more various small cells that may be connected to various smaller cell nodes, such as distributed antenna systems (DAS's), DAS head-ends, remote radio heads (RRH), or the like.

The mobile device 111 represents any operable device that is receiving service from the cellular network 110. For example, the mobile device 111 may be a mobile phone, tablet, laptop computer, vehicle communication device, or the like. The mobile device 111 may include network capabilities configured to receive communications or data over the cellular network. The mobile device 111 may represent a plurality of different mobile devices of various users of or subscribers to the cellular network 110.

The social media platform 112 represents one or more social media platforms that might contain information related to temporal obstructions, or potential temporal obstructions, in one or more cells of the cellular network 110. In some embodiments, the computer 120 is configured to be in communication with the social media platform 112 to scrape such information from the social media platform 112. Whatever the embodiment, the computer system 120 may be configured to receive information generated from the social media platform 112 related to temporal obstructions, or potential temporal obstructions. This information may be in the form of user communications, posts, conversations, user-input information, or the like. The information may further be in the form of text, images, video, or the like.

The web site 113 represents one or more websites that may be publicly available and may include information regarding potential or actual temporal obstructions. The web site 113 may be a government run or sponsored website, which may provide information to the public regarding planned events or the like. The web site 113 may be or may include a calendar that includes information related to potential or actual temporal obstructions, and the duration thereof. The web site 113 may private event-related website. For example, the web site 113 may be a business website of a concert venue, a park, a sports venue, a construction company website, a weather predicting website, or the like. Thus, the web site 113 may be any site that includes information related to planned temporary events.

The Application 114 may be any application that is internet-based and connected to the network 107. The application 114 may be a downloadable application that is operable on a user device such as the mobile device 111, or any other device. The application 114 may be configured to receive user information related to temporary obstructions. For example, the application 114 may be a user downloadable social media application, a user calendar application, or any other information which may contain and provide information to the computer system 120.

The network repository 115 is a data collection area on the network 107 which may back up and save all the data transmitted back and forth between the nodes of the network 107. For example, the network repository 115 may be a data center saving and cataloging data sent between the nodes of the network 107. The network repository 115 uses this data to generate databases related to the information received. In some embodiments, a data collection center housing the network repository 115 may include an analytic module capable of analyzing each piece of data being stored by the network repository 115. Further, the computer system 120 may be integrated with or may be a component of the data collection center housing the network repository 115. In some alternative embodiments, the network repository 115 may be a local repository that is connected to the computer system 120.

The network 107 is any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to of the cellular network 110, the mobile device 111, the social media platform 112, the web site 113, the application 114, and the network repository 115 via the network 107.

The computer system 120 is shown as a separate computer system from the cellular network 110 or cellular service provider in the embodiment shown. However, in other embodiments, the computer system 120 may be owned, operated and/or controlled by the cellular network 110 or cellular service provider. Thus, the computer system 120 may be a system used and implemented by a cellular service provider itself, or through a third-party service to which the cellular service provider or the provider of the cellular network 110 subscribes.

The computer system 120 is shown including a small cell unobstructed range module 125. The small cell unobstructed range module 125 may include information related to the unobstructed ranges of cells. The small cell unobstructed range module 125 may include information related to small cells such as microcells, picocells, femtocells, or the like. The small cell unobstructed range module 125 may include ranges or radii of each small cell located therein, when no obstructions exist.

The computer system 120 is shown including a small cell temporal obstruction range repository 126. The small cell temporal obstruction range repository 126 may include updated information related to predicted or actual obstructed ranges, or current ranges based on temporal obstructions which exist. The small cell temporal obstruction range repository 126 may include information related to the same cells that are found in the small cell unobstructed range module 125. However, the small cell unobstructed range module 125 may be constantly updated, monitored, and changed, when the computer system 120 receives new information related to actual radii of service provided by each of the small cells located therein.

Embodiments of the computer system 120 is shown including a module structure 130 that includes a receiving module 131, a repository maintenance module 132, an analytics module 133, and an output module 138. The analytics module 133 includes further sub-modules therein, including but not limited to a range analysis module 134, an obstruction type analysis module 135, an obstruction duration analysis module 136, and a prediction analysis module 137. A "module" herein refers to any hardware-based module, software-based module, or combination thereof. Embodiments of hardware-based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 include one or more components of hardware and/or software program code for obtaining, retrieving, collecting, or otherwise receiving information from the cellular network 110, the mobile device 111, the social media platform 112, the web site 113, the application 114, and the network repository 115. In an exemplary embodiment, the receiving module 131 is configured to receive information related to current ranges or radii or connectivity from the cellular network 110. The receiving module 131 may be configured for receiving information for the small cell unobstructed range repository 125 from the cellular network 110 or service provider. This information may include expected unobstructed ranges for each cell within a network. The receiving module 131 may be configured to receive information from mobile devices 111 related to actual cellular service within the network. The receiving module 131 may be configured to receive information from the social media platforms. For example, the receiving module 131 may interface with social media platforms to scrape or be provided information from such platforms. This information may come from individual users, or may come from businesses, government, or other group pages or profiles. The receiving module 131 may be configured to receive information from web sites 113 and may be configured to scrape web sites for this information. The receiving module 131 may be configured to receive information from applications 114 which may be interfaced with the computer system 120. The information provided from these sources to the receiving module 131 may be in the form of text, images, videos, or application specific data that may be capable of analysis by the computer system 120. The receiving module 131 provides information received by the computer system 120 from the of the cellular network 110, the mobile device 111, the social media platform 112, the web site 113, the application 114, and the network repository 115 to be stored in a data repository of the computer system 120, such as one or both of the small cell unobstructed range repository 125 or the small cell temporal obstruction repository 126, or another data repository or memory location, such as the memory 141.

Referring still to FIG. 1, embodiments of the computer system 120 shown further includes a repository maintenance module 132. Embodiments of the repository maintenance module 132 include one or more components of hardware and/or software program code configured for maintaining each of the small cell unobstructed range module 125 and the small cell temporal obstruction range repository 126. For example, the repository maintenance module 132 may be configured to receive and maintain the current network configuration of a small cell network, including information on each of the unobstructed ranges of the cells therein. As new cells are added to the network provider, the computer system 120 may be provided with this information and update the small cell unobstructed range module 125 appropriately.

Similarly, as information is received and analyzed by the analytics module 133 of the computer system 120 regarding temporal obstructions to the network, the repository maintenance module 132 may be configured to maintain changes in range reported or anticipated within the small cell temporal obstruction range repository 126, because of such analyzed temporal obstructions. The repository maintenance module 132 may be configured to maintain multiple small cell temporal obstruction range repositories, such as the small cell temporal obstruction range repository 126. For example, the repository maintenance module 132 may be configured to maintain a current small cell temporal obstruction range repository, and a predicted future small cell temporal obstruction range repository. The information maintained by the repository maintenance module 132 may be configured to create any number of models, based on current and anticipated future conditions. In one embodiment, the information maintained by the repository maintenance module 132 may be configured to predict range impact based on events that may not be imminent or planned. Such models may be helpful to a cellular network provider in planning how to build a new network or add to an existing network. Whenever information is received, and range impact is determined, the repository maintenance module 132 may be configured to update the small cell temporal obstruction range repository 126 so that any appropriate models may be generated.

Referring still to FIG. 1, embodiments of the computer system 120 shown further includes an analytics module 133. Embodiments of the analytics module 133 include one or more components of hardware and/or software program code configured for analyzing the information received and/or processed by the receiving module 131. The analytics module 133 may be configured to perform various forms of analytics on the information received and may include various sub-modules for performing the analytics including but not limited to the modules 134, 135, 136, 137 described herein. The analytics module 133 may be configured to create models describing the current and predicted future ranges of the cells within a network accounting for the impact of temporal obstructions on the ranges or radii of the cells. The analytics module 133 may be configured to make determinations based on the analysis conducted, including providing recommendations, or outputs, to the various elements in the system of cognitive analysis of temporal obstructions in a cellular network 100.

Referring still to FIG. 1, the computer system 120 further includes a range analysis module 134, which may be considered a sub-module of the analytics module 133. Embodiments of the range analysis module 134 include one or more components of hardware and/or software program code configured for determining a change in a range of a cell within the cellular network 110 caused by a temporal obstruction. The range analysis module 134 may be an analytics engine that is configured to analyze information received by performing a cognitive search of information received to identify patterns, trends and actionable insights. The range analysis module 134 may be configured to use natural language understanding techniques to analyze text and extract meta-data from textual content such as concepts, entities, keywords, categories, sentiment, emotion, relations, semantic roles, etc. The range analysis module 134 may be configured to apply natural language classifiers to use cognitive computing techniques to return the best matching classes for a sentence or phrase. The range analysis module 134 may be configured to perform visual recognition on image information received to derive categorizations and classifications of objects and scenes. This analysis may be performed by the range analysis module 134 in order to determine whether a temporal obstruction currently exists, or is likely to exist in the future, that is likely to cause an impact on cellular range within a network.

The range analysis module 134 may be configured to request and/or receive information from the small cell unobstructed range module 125 to determine a base range of each small cell in the cellular network 110. The range analysis module 134 may be configured to utilize models developed based on an analysis of historical range impacts on temporal obstructions that may be similar to a potential or actual temporal obstruction currently being analyzed. Thus, the range analysis module 134 may be a learning module that is configured to learn as more data and information is received related to various temporal obstructions. The range analysis module 134 may be configured to categorize temporal obstructions into types, so that predicted range impacts can be more accurate to reflect the type of obstruction. The range analysis module 134 may learn that one type of temporal obstruction is likely to cause a greater or lesser impact than another. The range analysis module 134 may be configured to reduce the base range found or retrieved from the small cell unobstructed range module 125 and update the small cell temporal obstruction range repository 126 with the new range that accounts for the temporal obstruction that was calculated based on the analysis conducted.

The range analysis module 134 may be configured to determine range impact of a cell based on particular directions of impact. For example, the range analysis module 134 may be configured to determine that a temporal obstruction is likely to only cause an obstruction to the north of a given cell, but will not cause any obstruction in the south, east or west directions. The range analysis module 134 may be accurate in determining the actual range of a cell and may be configured to determine specific non-uniform shapes of the cell range caused by temporal obstructions.

Referring still to FIG. 1, the computer system 120 further includes an obstruction type analysis module 135, which may be considered a sub-module of the analytics module 133. Embodiments of the obstruction type analysis module 134 include one or more components of hardware and/or software program code configured for determining the type of temporal obstruction that is impacting, or likely to impact in the future, the cellular network 110. The obstruction type analysis module 135 may be a sub-module of the range analysis module 134 and/or may coordinate with the range analysis module 134 in order to determine the impacted range of a cell in the cellular network 110 because of the temporal obstruction. The obstruction type analysis module 135 may retain a database or repository of models or data related to the type of temporal obstruction and the impact of such a temporal obstruction. For example, if information is received that a temporal obstruction is of the traffic type, and the temporal obstruction has been found to historically impact the range of a particular cell in a particular way, the next time the traffic type of temporal obstruction is present, the obstruction type analysis module 135 may help predict the impact of the range. Further, if a traffic type of temporal obstruction is found proximate another cell where there is no historical data, the obstruction type analysis module 135 may locate the closest similar cell that has experienced the same type of temporal obstruction and use this information to predict the impact on the new cell.

Referring still to FIG. 1, the computer system 120 further includes an obstruction duration analysis module 136, which may be considered a sub-module of the analytics module 133. Embodiments of the obstruction duration analysis module 136 include one or more components of hardware and/or software program code configured for determining or predicting a duration of a temporal obstruction. The obstruction duration analysis module 136 may be a sub-module of the range analysis module 134 or the obstruction type analysis module 135 and/or may coordinate with these modules 134, 135 in order to determine the impacted duration of a cell in the cellular network 110 because of a temporal obstruction. The obstruction duration analysis module 136 may retain a database or repository of models or data related to the duration of various types of temporal obstructions and the impact of such temporal obstructions. For example, if it is known that the traffic obstruction for a particular small cell in the cellular network 110 occurs during weekdays between the hours of 7 and 9 AM, and 4 and 6 PM, the obstruction duration analysis module 136 may determine that the small cell is likely to experience the temporal obstruction on future days that are within this time duration. In situations where a new cell exists without historical data, the obstruction duration analysis module 136 may be configured to utilize the data on similar small cells in order to make future predictions on the new cells.

The obstruction duration analysis module 136 may be configured to perform a cognitive analysis on text, images, videos and other data received in order to predict durations on one-time events as well. For example, the obstruction duration analysis module 136 may use language recognition techniques to determine that a given event that occurs at a given venue is likely to cause traffic in the two hours leading up to the event. The obstruction duration analysis module 136 may further be configured to directly ascertain durations based on posted durations, such as a construction schedule, the advertised time for a parade event, or the like. Overall, the obstruction duration analysis module 136 may store duration information related to current and historical temporal obstructions and utilize this information to determine the duration of current and future temporal obstructions.

Referring still to FIG. 1, the computer system 120 further includes a prediction analysis module 137, which may be considered a sub-module of the analytics module 133. Embodiments of the prediction analysis module 137 include one or more components of hardware and/or software program code configured for predicting a future temporal obstruction from information received related to potential future temporal obstructions. The prediction analysis module 137 may be configured to review historical models within the range analysis module 134, the obstruction type analysis module 135 and the obstruction duration analysis module 136 in order to determine likely ranges and durations for a given type of obstruction. For example, if it is determined that a given type of obstruction is likely to occur on a small cell, the prediction analysis module 137 may be configured to determine whether this type of obstruction has impacted the small cell in the past. If so, the prediction analysis module 137 may utilize this historical data to determine the likely impact on the new obstruction in the future. If no historical impact is found on a particular cell, the prediction analysis module 137 may be configured to review similarly situated cells that have been impacted by similar type temporal obstructions. The prediction analysis module 137 may then be able to determine the typical ranges and durations caused by that type of temporal obstruction on those similarly situated small cells. The prediction analysis module 137 may then be configured to predict the likely range impact, and duration, of such the predicted temporal obstruction on the small cell.

Referring still to FIG. 1, embodiments of the computer system 120 shown further includes an output module 138. Embodiments of the output module 138 include one or more components of hardware and/or software program code configured for providing outputs to the various devices within the system of cognitive analysis of temporal obstructions in a cellular network 100. For example, the output module 138 may be configured to output models generated by the analytics module 133 and stored in the repositories 125, 126. The output module 138 may be configured to provide an output that initiates a network switch procedure for switching the small cell that is providing service to a mobile device serviced by the network. The output module 138 may be configured to control the network service based on the information found and created by the computer system 120 and the analytics module 133.

The output module 138 may be configured to provide output notifications or recommendations to cellular network providers with information related to expected or current changes to network range as a result of temporal obstructions. The output module 138 may be configured to provide outputs related to the type and duration of expected networks. This information may help a network provider to make physical changes to the network or change which cells have priority over which areas within the network. The output module 138 may be configured to provide network providers with recommendations as to how to make changes to the network.

The output module 138 may be configured to make these physical network changes, such as adding cells to a network. For example, the output module 138 may be connected to robotically controlled network cells. For example, a robot may be controlled by the output module 138 and may make physical changes to the network cells, such as moving the cells to different locations. For example, the output module 138 may be configured to deploy or otherwise control small cells carried by flying drones to locations where network service is has determined to be needed as a result of a found temporal obstruction that has reduced the range of permanent cells.

The output module 138 may be configured to provide output models on at the demand of a network engineer, or the like, based on input hypothetical temporal obstructions to a system as input by the network engineer. The output module 138 may utilize the information found and created by the computer system 120 and the analytics module 133. The output module 138 may be configured to provide whatever other outputs are appropriate based on the knowledge of temporal obstructions, and the impact of such obstructions on the ranges of small cells within a network.

Referring still to FIG. 1, embodiments of the computer system 120 may be equipped with a memory device 142 which may store information being used by the module structure 130 of the computer system 120. The computer system 120 may further be equipped with a processor 141 for implementing the tasks associated with the system of cognitive analysis of temporal obstructions in a cellular network 100 and perform processing associated with the functionality of the module structure 130.

Figure 2:
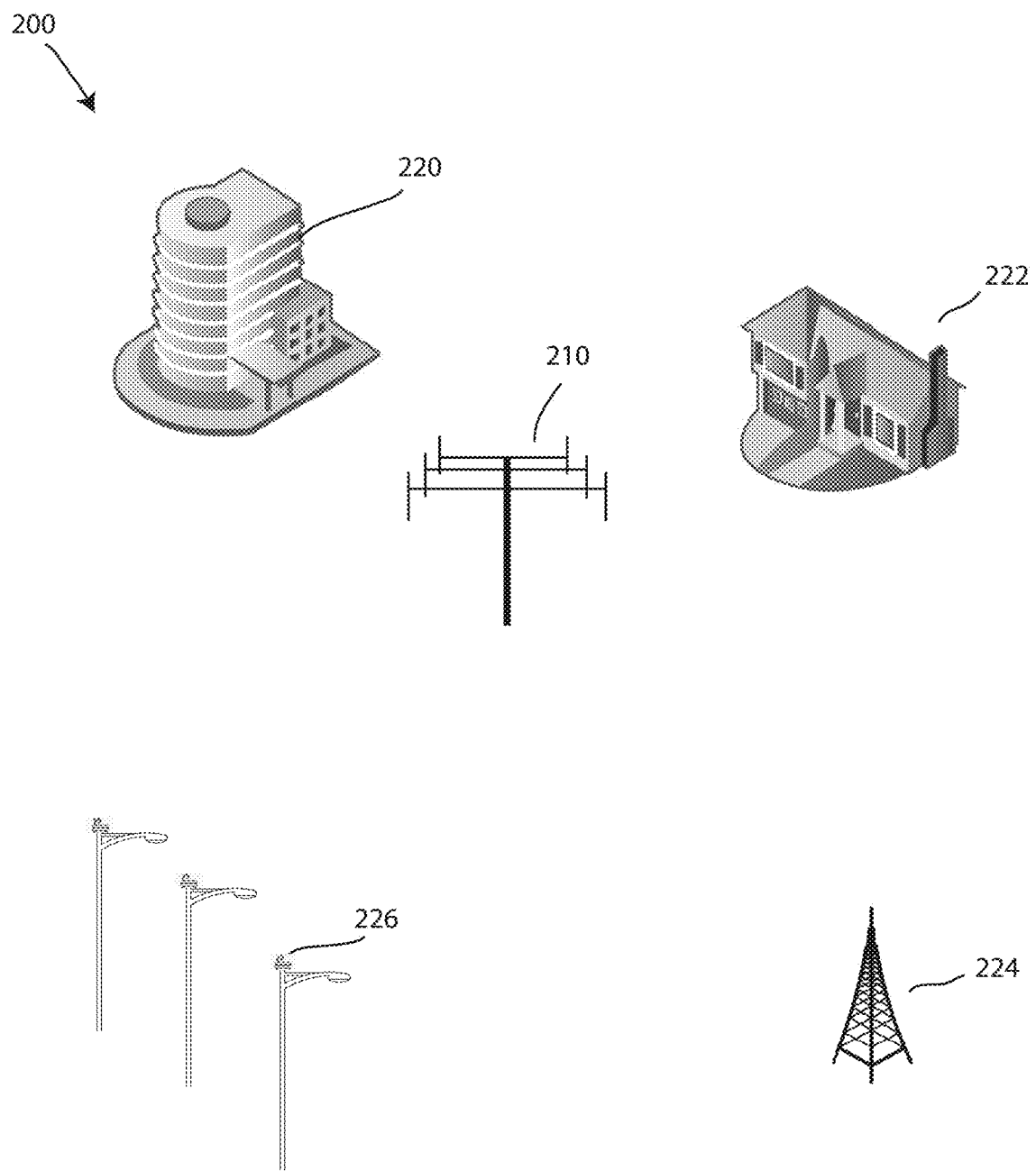
FIG. 2 depicts a cellular network, in accordance with embodiments of the present invention.

FIG. 2 depicts a cellular network 200, in accordance with embodiments of the present invention. The cellular network 200 represents an exemplary cellular network which may be analyzed for temporal obstructions in accordance with embodiments described herein. The cellular network 200 is shown including a macro cell 210, which may be a macro site, and may be configured to provide radio coverage served by a high-power cell site, such as a tower, antenna, or mast. The cellular network 200 includes various smaller cells located in proximity thereof. The cellular network 200 includes, for example, one or more enterprise small cells 220, such as an enterprise femtocell located within a business building. The network 200 includes residential small cells 222 located within or deployed in residences or residential communities. The residential small cells may be femtocells, or the like. The network 200 includes public access small cells 224, which may be other public cells which may be picocells, microcells, or femtocells, located on buildings or at other sites covering large areas. The network 200 further includes one or more outdoor small cells 226, which may be femtocells, picocells, microcells or the like. The outdoor small cells 226 may located on any outdoor structure, such as a lamp post, street sign, traffic light, building, or the like. The cellular network 200 is shown including exemplary components. However, embodiments of the present invention may be configured for any type of cellular network 200 including any number of cells of various coverage strengths.

Figure 3:
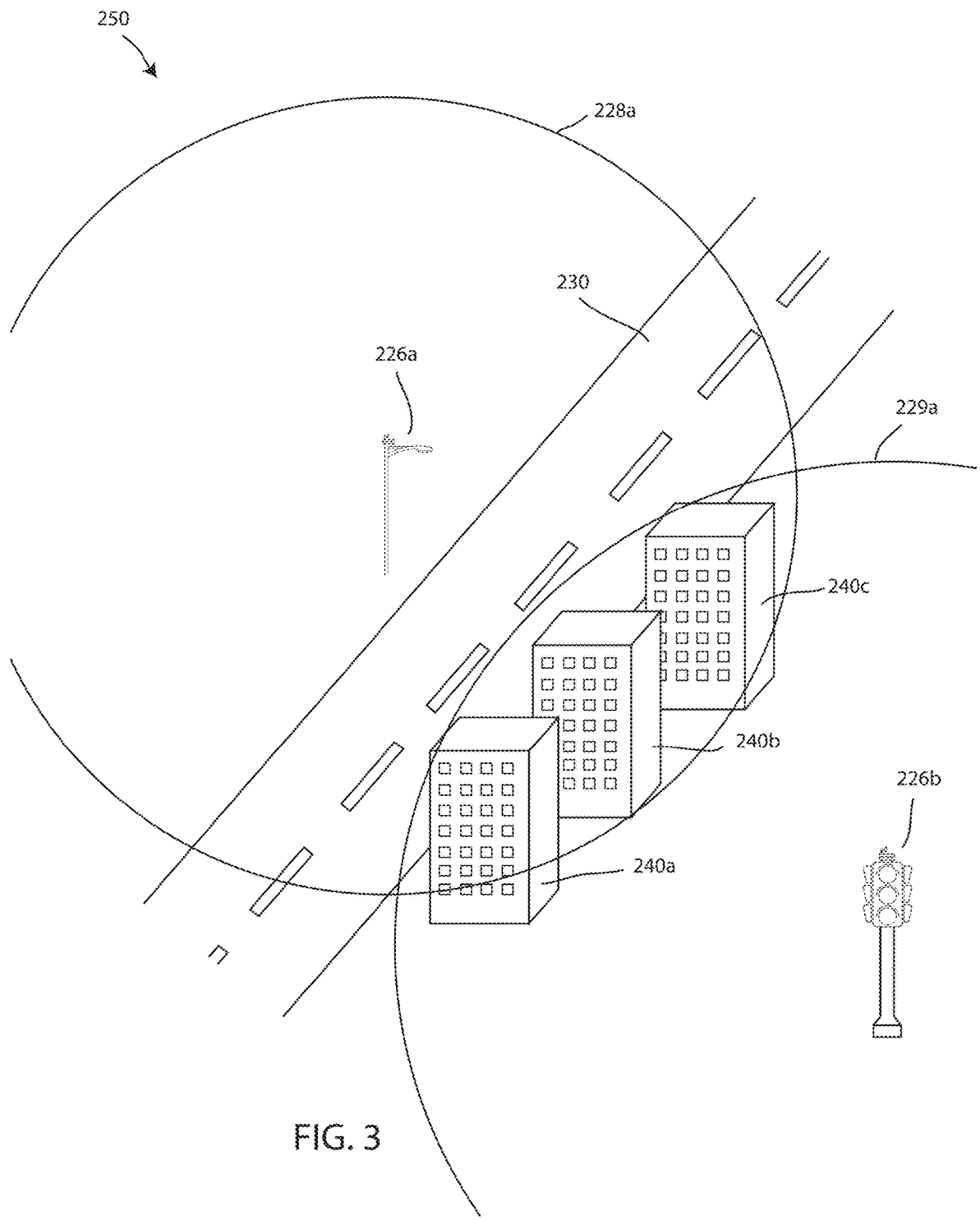
FIG. 3 depicts a two overlapping small cells of a small cell densified network such as the network of FIG. 2, without a temporal obstruction, in accordance with embodiments of the present invention.

FIG. 3 depicts a schematic 250 of two overlapping small cells 226a, 226b of a small cell densified network, such as the cellular network 200 of FIG. 2, without a temporal obstruction, in accordance with embodiments of the present invention. The schematic 250 shows a first small cell 226*a* which is attached or otherwise affixed to a top of a street lamp next to a road 230. The first small cell 226*a* includes a range 228*a* that extends in a circle about the first small cell 226*a*. The second small cell 226*b* is located within a device affixed above a street light, and includes a range 229*a* that extends in a circle about the second small cell 226*b*, a plurality of buildings 240*a*, 240*b*, 240*c* are located on an opposite side of the road 230 from which the first small cell 226*a* is located. The plurality of buildings 240*a*, 240*b*, 240*c* are located largely in an overlapping position that may receive network service by either the first small cell 226*a*, or the second small cell 226*b*.

Figure 4:
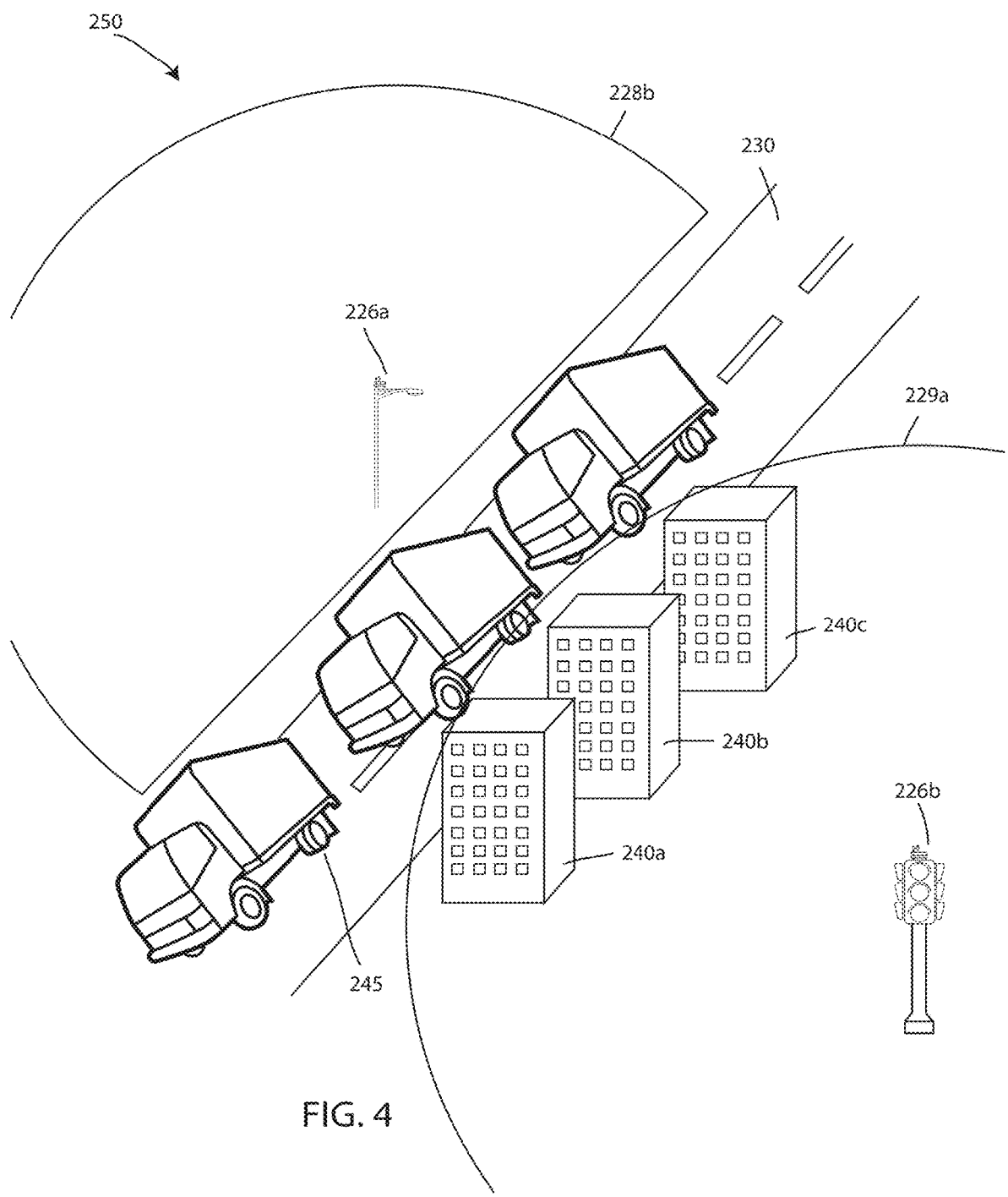
FIG. 4 depicts the two small cells of FIG. 3, with a temporal obstruction, in accordance with embodiments of the present invention.

FIG. 4 depicts the two small cells 226*a*, 226*b* of FIG. 3, with a temporal obstruction 245 located within the road 230, in accordance with embodiments of the present invention. The temporal obstruction 245 is shown as a plurality of large construction vehicles located within the road 230 blocking the cellular range of the first small cell 226 from extending across the road 230 to the buildings 240*a*, 240*b*, 240*c*. In this embodiment, the computer system 120 may be configured to receive information related to the temporal obstruction 245 from one of the information sources described hereinabove. For example, the computer system 120 may be able to ascertain from a photograph posted by a user on a social media platform, that construction is currently occurring on the road 230. The computer system may be configured to perform image analysis techniques on images received of the currently occurring construction project. Alternatively, the computer system 120 may receive information from the town or municipality that relates to the construction, or a web site hosted or controlled by the municipality. This information may include the predicted duration of the construction, including the time it is expected to begin. The computer system 120 may be configured to perform natural language analysis techniques on the text of the municipality website.

From this received information, the computer system 120 may be able to determine that the network service is impacted. For example, the computer system 120 may be configured to determine that the buildings 240*a*, 240*b*, 240*c* may no longer have network service from the first small cell 226*a* but must use service only from the second small cell 226*b*. The computer system may be configured to determine a change in the range of the first small cell 226*a*, the computer system 120 may be configured to determine a type of temporal obstruction (i.e. construction or roadwork) and may be configured to determine that the timing and duration of the temporal obstruction (e.g. the temporal obstruction is in place between the hours of 9-5 on Monday and Tuesday). The computer system 120 may be configured to put into place automatic conditions within the network system for requiring all service in the buildings 240*a*, 240*b*, 240*c*, or across the road, to be fulfilled by the second small cell 226*b*. The computer system 120 may be configured to provide recommendations for increased small cells to be added to the network should it be determined the need warrants the addition of such cells. The computer system 120 may further be configured to initiate or perform switches in connections to the second small cell 226*b* from the first small cell 226*a* in a manner that avoids dropped calls from an unexpected lack of service by the first small cell 226*a* across the road.

Figure 5:
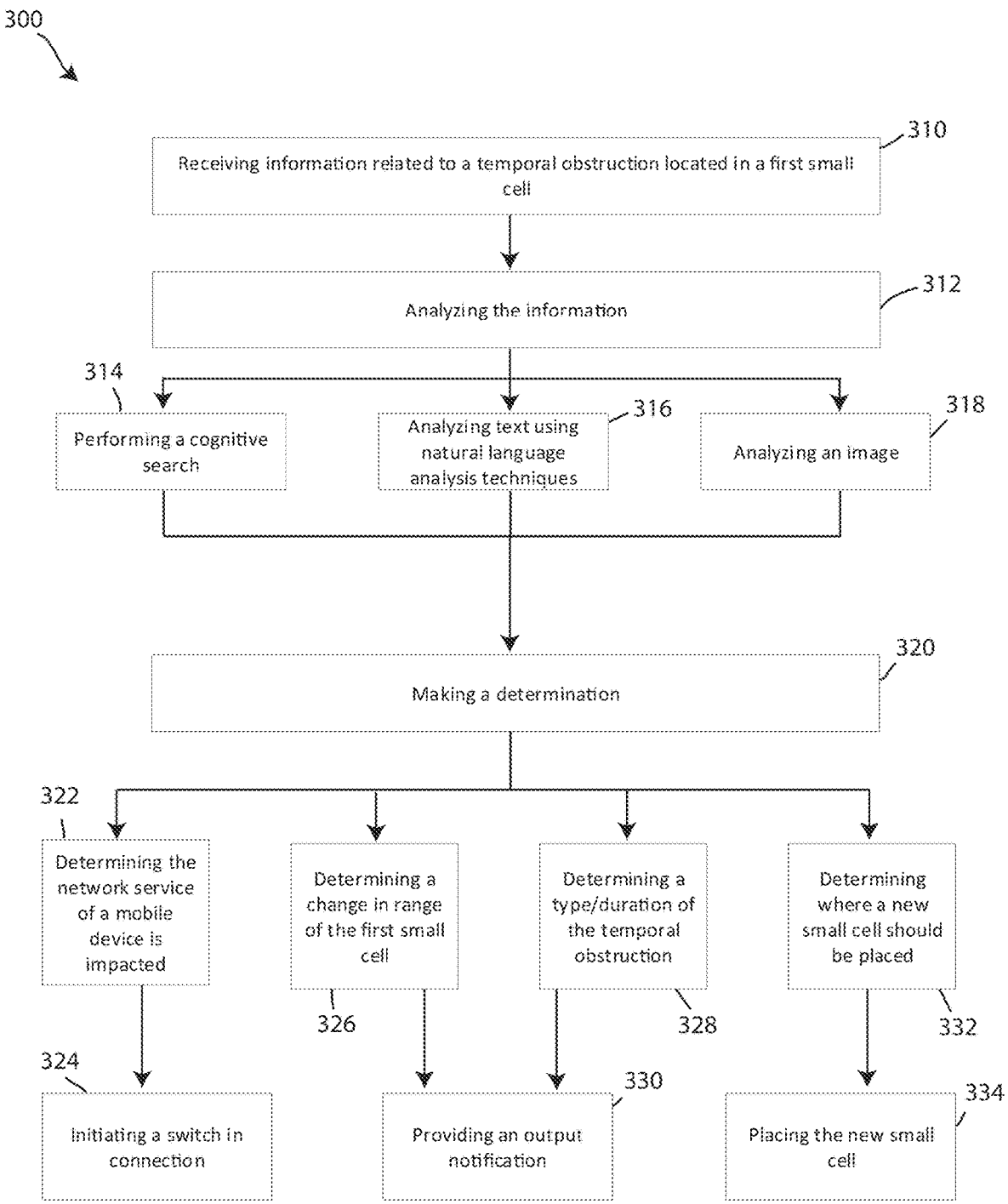
FIG. 5 depicts a flow chart of a method of cognitive analysis of temporal obstructions in a cellular network, in accordance with embodiments of the present invention.

FIG. 5 depicts a flow chart of a method 300 of cognitive analysis of temporal obstructions in a cellular network, in accordance with embodiments of the present invention. The method 300 includes a step 310 of receiving, by one or more processors of a computer system such as the computer system 120, information related to a temporal obstruction located within a first small cell of a network. The receiving of step 310 may be received from at least one information source selected from the group consisting of a social network, a web site, a forum, and a calendar application. The method 300 includes a next step 312 of analyzing, by the one or more processors of the computer system, the information related to the temporal obstruction.

The analysis done in step 312 may take various forms. For example, the method 300 may include a step 314 of performing, by the one or more processors of the computer system, a cognitive search to identify at least one of a pattern, a trend or an actionable insight, based on the information received. The method 300 may include a step 316 of analyzing, by the one or more processors of the computer system, text using natural language analysis techniques to extract meta data from content, based on the information received. The method 300 may include a step 318 of analyzing, by the one or more processors of the computer system, an image and deriving categorizations or classifications of objects and scenes in the image, based on the information received.

The method 300 then includes a step 320 of making a determination based on the analyzing. For example, the method 300 may then include a step 322 of determining, by the one or more processors of the computer system, that network service of a mobile device connected to the first small cell is impacted by the temporal obstruction, followed by a step 324 of initiating, by the one or more processors of the computer system, a switch in the connection for the mobile device from the first small cell to a second small cell of the network in response to the determining the that the network service of the mobile device connected to the first small cell is impacted by the temporal obstruction.

In another example, the method 300 may include a step 326 of determining, by the one or more processors of the computer system, a change in a range of the first small cell caused by the temporal obstruction, or a step 328 of determining, by the one or more processors of the computer system, a type or expected duration of the temporal obstruction. The method 300 may then include a step 330 of providing an output notification, based on the steps 326 or 328.

In another example of making a determination based on the received information and analysis, the method 300 include a step 332 of determining, by the one or more processors of the computer system, where a new small cell should be placed in the network to compensate for the change in the range of the first small cell caused by the temporal obstruction. In one embodiment, the method 300 may include a step 334 of placing the new small cell in the network in response to the determining where the new small cell should be placed.

Figure 6:
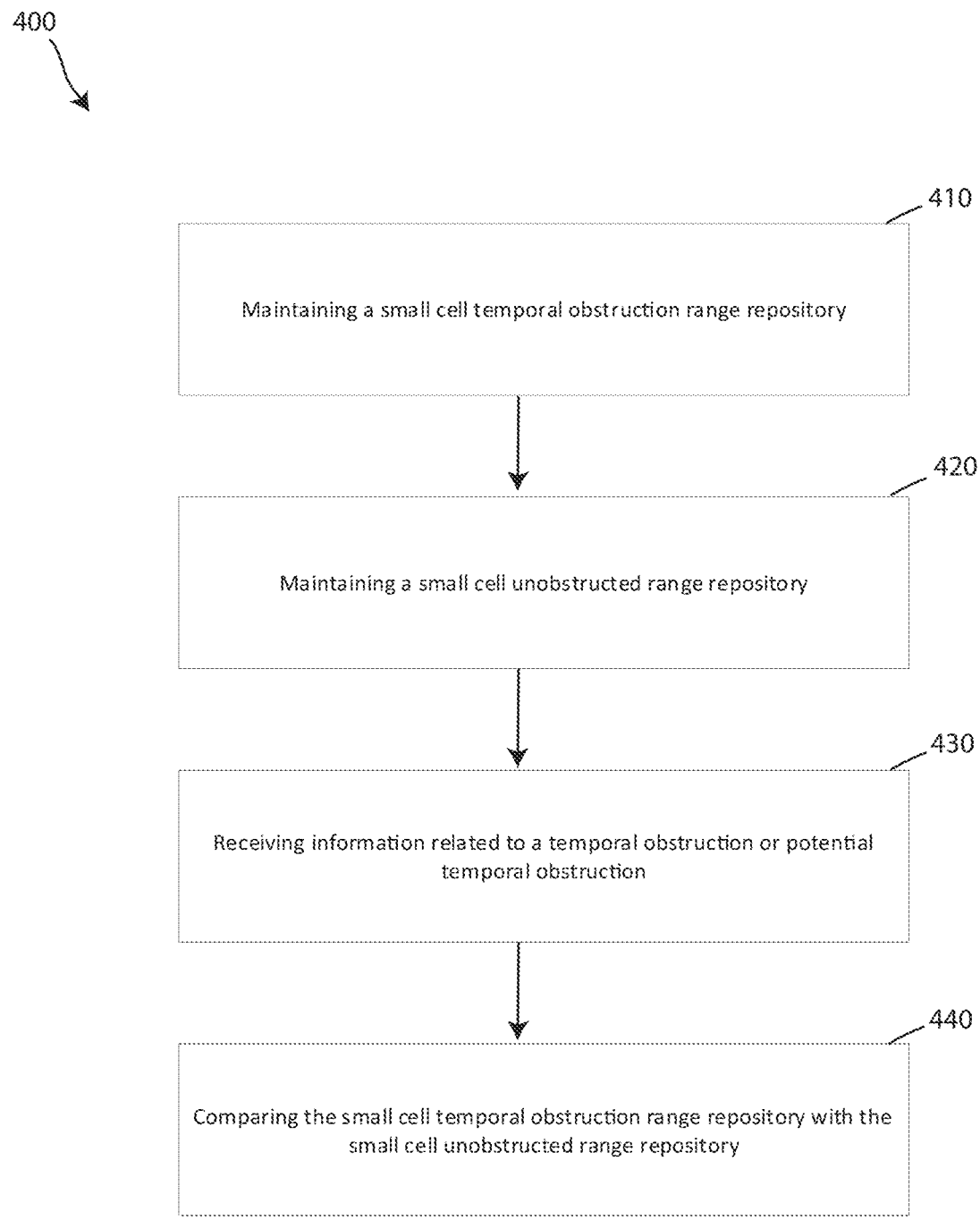
FIG. 6 depicts a flow chart of a method of comparing range repositories, in accordance with embodiments of the present invention.

FIG. 6 depicts a flow chart of a method 400 of comparing range repositories, in accordance with embodiments of the present invention. The method 400 include a first step 410 of maintaining, by the one or more processors of the computer system, a small cell temporal obstruction range repository such as the repository 126. The small cell temporal obstruction range repository may include range information of a plurality of small cells in the network, the range information accounting for known temporal obstructions. The method 400 may include a step 420 of maintaining, by the one or more processors of the computer system, a small cell unobstructed range repository, such as the repository 125. The small cell unobstructed range repository includes range information of the plurality of small cells in the network that does not account for known temporal obstructions. The method 400 may include a step 430 of receiving information related to a temporal obstruction or potential temporal obstruction. The method 400 may include a step 440 of comparing, by the one or more processors of the computer system, the small cell temporal obstruction range repository with the small cell unobstructed range repository. The comparing step 440 may be one of the steps included in the analysis step 312 and/or the determining step 320 of the method 300 described herein above.

Figure 7:
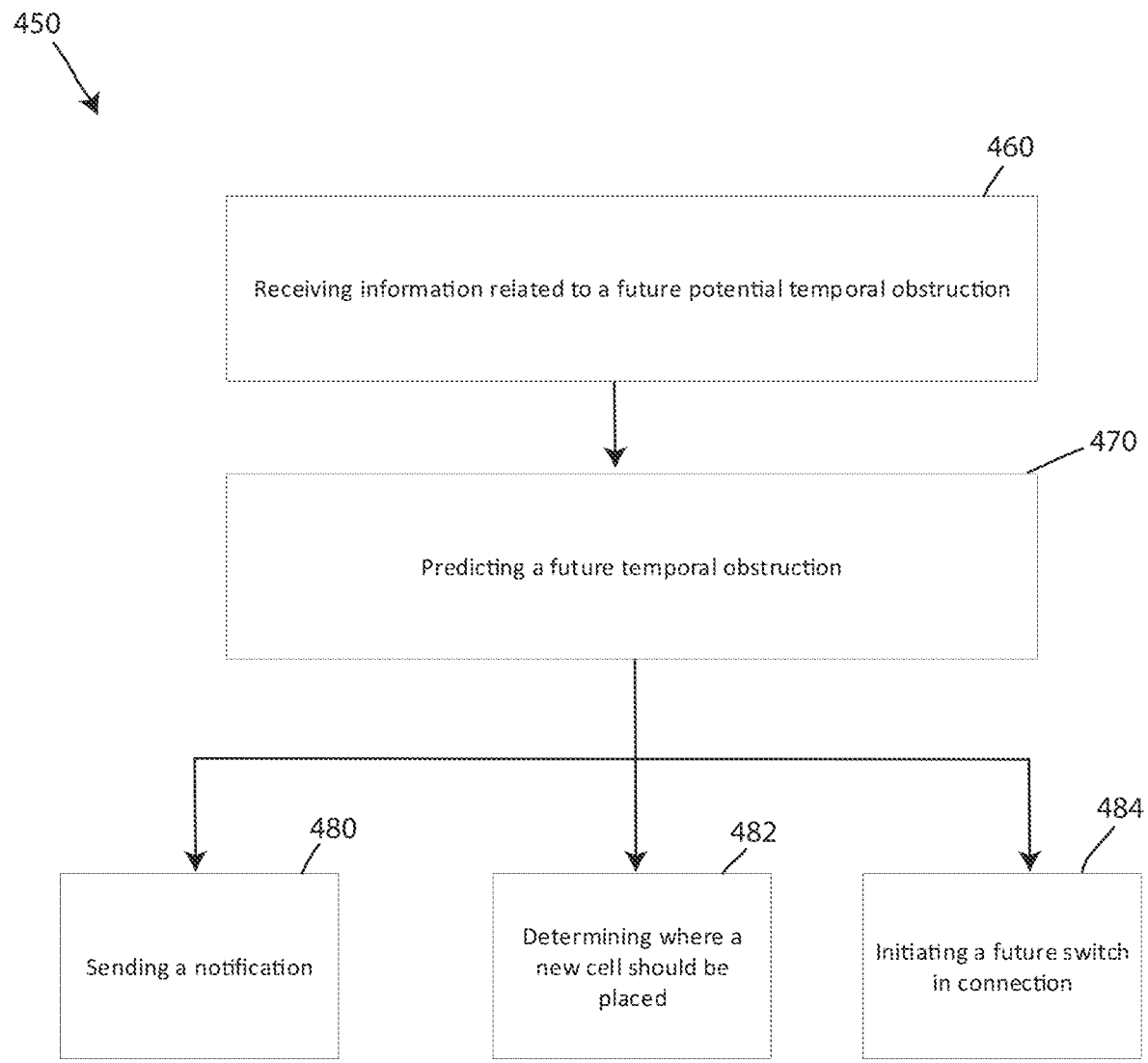
FIG. 7 depicts a flow chart of a method of cognitive analysis of future potential temporal obstructions in a cellular network, in accordance with embodiments of the present invention.

FIG. 7 depicts a flow chart of a method 450 of cognitive analysis of future potential temporal obstructions in a cellular network, in accordance with embodiments of the present invention. The method 450 includes a step 460 of receiving, by the one or more processors of the computer system, information related to a potential future temporal obstruction located within a network. The method 450 includes a step 470 of predicting, by the one or more processors of the computer system, a future temporal obstruction, from the information related to the potential future temporal obstruction. Once the predicted future temporal obstruction is determined, the method 450 may implement various steps based on the prediction. For example, the method 450 may include a step 480 of sending, by the one or more processors of the computer system, a notification of the future temporal obstruction. The method 450 may include a step 482 of determining where a new cell should be placed within the network based on the predicted future temporal obstruction. The method 450 may include a step 484 of initiating a future switch to another cell based on the predicted future temporal obstruction. The step 450 may include implementing a new condition on the network in which the future switch will be implemented.

Figure 8:
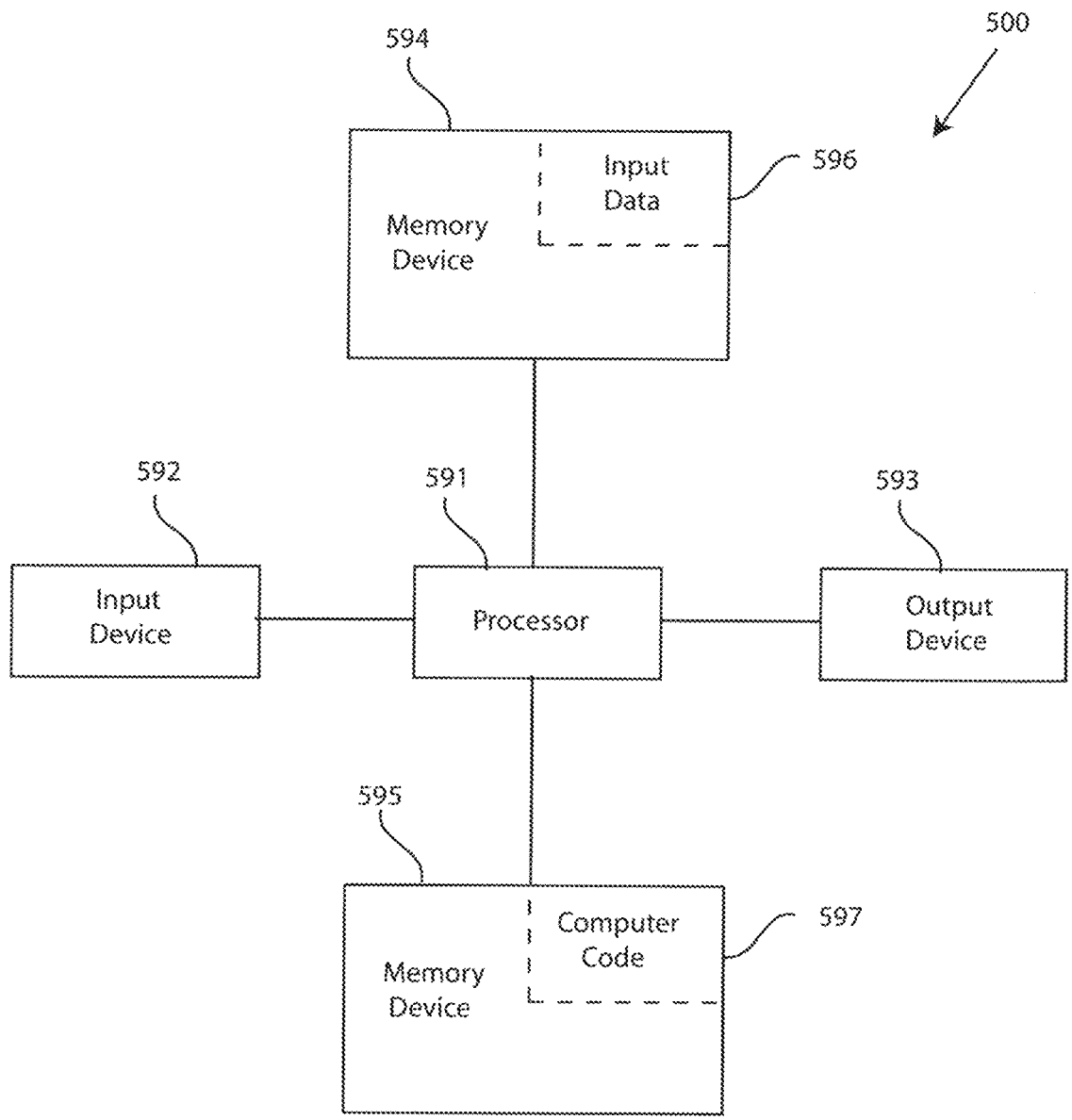
FIG. 8 depicts a block diagram of a computer system of the system of cognitive analysis of temporal obstructions in a cellular network of FIG. 1, capable of implementing methods for cognitive analysis of temporal obstructions in a cellular network in FIGS. 5-7, in accordance with embodiments of the present invention.

FIG. 8 illustrates a block diagram of a computer system that may representative of any computer or computer system within the system of cognitive analysis of temporal obstructions in a cellular network 100 of FIG. 1, capable of implementing methods of cognitive analysis of temporal obstructions in a cellular network of FIGS. 5-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method of cognitive analysis of temporal obstructions in a cellular network, in the manner prescribed by the embodiments of FIGS. 5-7 using the system of cognitive analysis of temporal obstructions in a cellular network 100 of FIG. 1, wherein the instructions of the computer code 597 may be executed by processor 591 via memory device 595. The computer code 597 may include software or program instructions that may implement one or more algorithms for implementing the methods of cognitive analysis of temporal obstructions in a cellular network, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system, and in a third embodiment, the present invention may be a computer program product. Any of the components of the embodiments of the present invention can be deployed, managed, serviced, etc. by a service provider that offers to deploy or integrate computing infrastructure with respect to systems and methods of cognitive analysis of temporal obstructions in a cellular network. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system to provide a system of cognitive analysis of temporal obstructions in a cellular network. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of cognitive analysis of temporal obstructions in a cellular network. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method of cognitive analysis of temporal obstructions in a cellular network.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
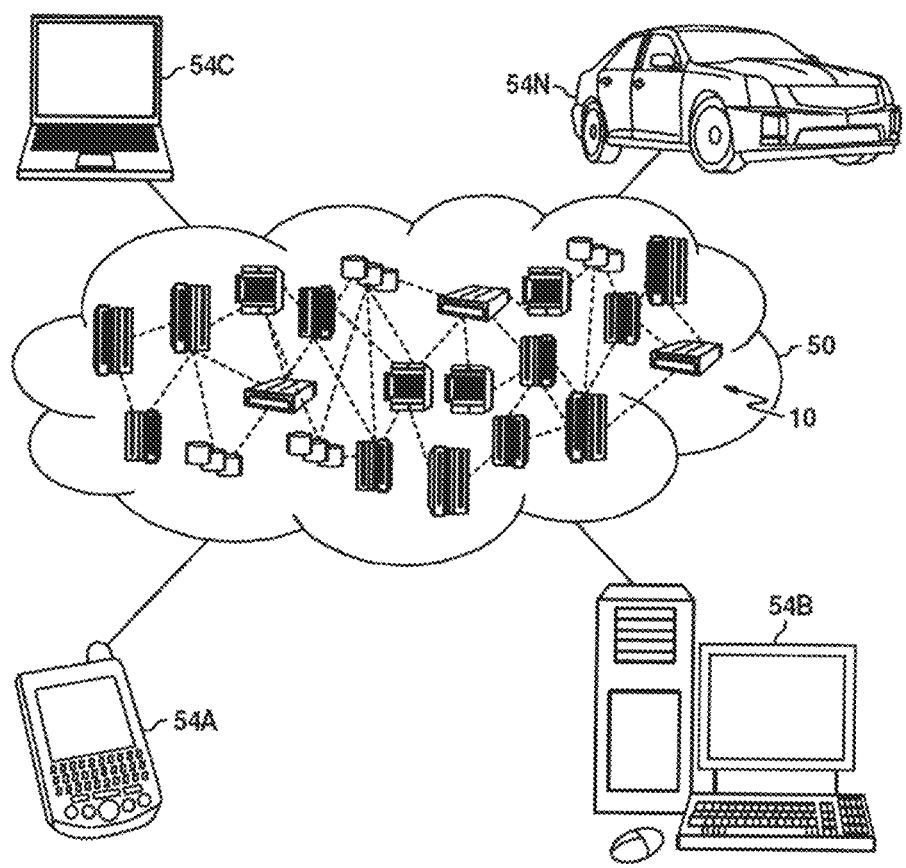
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
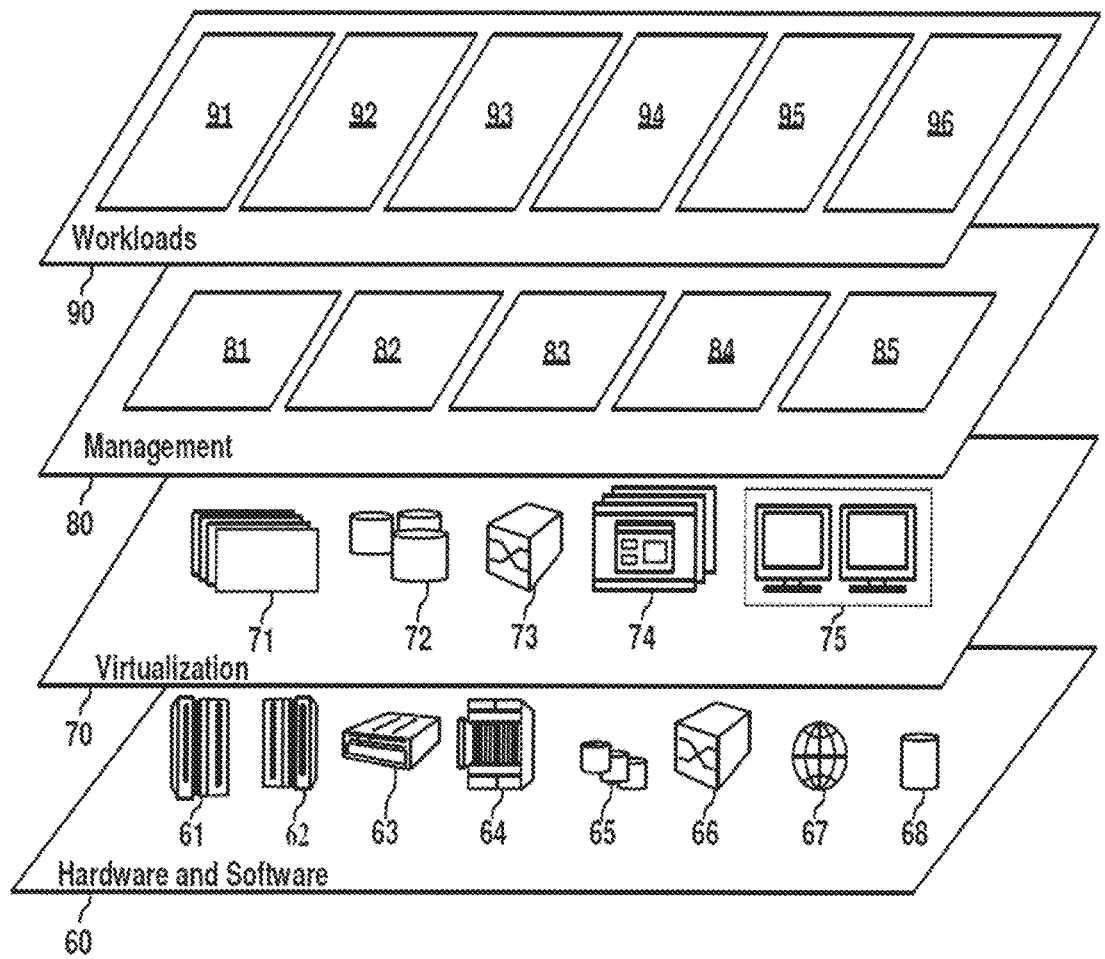
FIG. 10 depicts abstraction model layers, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to cognitive analysis of temporal obstructions in a cellular network 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   receiving, by one or more processors of a computer system, information related to a temporal obstruction located within a first small cell of a network;
   analyzing, by the one or more processors of the computer system, the information related to the temporal obstruction;
   determining, by the one or more processors of the computer system, a change in a range of the first small cell caused by the temporal obstruction, and
   sending, by the one or more processors of the computer system, a notification related to the change in the range of the first small cell caused by the temporal obstruction,
   wherein the information received during the receiving is received from at least one information source, and wherein the analyzing further includes at least one of:
      performing by the one or more processors of the computer system, a cognitive search to identify at least one of a pattern, a trend or an actionable insight;
      analyzing, by the one or more processors of the computer system, text using natural language analysis techniques to extract meta data from content; and
      analyzing, by the one or more processors of the computer system, an image and deriving categorizations or classifications of objects and scenes in the image.

2. The method of claim 1, further comprising:
   determining, by the one or more processors of the computer system, that network service of a mobile device connected to the first small cell is impacted by the temporal obstruction;
   initiating, by the one or more processors of the computer system, a switch in the connection for the mobile device from the first small cell to a second small cell of the network in response to the determining that the network service of the mobile device connected to the first small cell is impacted by the temporal obstruction.

3. The method of claim 1, further comprising:
   maintaining, by the one or more processors of the computer system, a small cell temporal obstruction range repository, wherein the small cell temporal obstruction range repository includes range information of a plurality of small cells in the network including the first small cell, the range information accounting for known temporal obstructions;
   maintaining, by the one or more processors of the computer system, a small cell unobstructed range repository, wherein the small cell unobstructed range repository includes range information of the plurality of small cells in the network that does not account for known temporal obstructions;

comparing, by the one or more processors of the computer system, the small cell temporal obstruction range repository with the small cell unobstructed range repository.

4. The method of claim 1, further comprising:

receiving, by the one or more processors of the computer system, information related to a potential future temporal obstruction located within the network;

predicting, by the one or more processors of the computer system, a future temporal obstruction, from the information related to the potential future temporal obstruction; and sending, by the one or more processors of the computer system, a notification of the future temporal obstruction.

5. The method of claim 1, further comprising:

determining, by the one or more processors of the computer system, where a new small cell should be placed in the network to compensate for the change in the range of the first small cell caused by the temporal obstruction; and placing the new small cell in the network in response to the determining where the new small cell should be placed.

6. The method of claim 1, wherein the analyzing further includes at least one of:

determining, by the one or more processors of the computer system, a type of the temporal obstruction; and determining, by the one or more processors of the computer system, an expected duration of the temporal obstruction.

7. The method of claim 1, wherein the at least one information source is selected from the group consisting of a social network, a web site, a forum, and a calendar application.

8. A computer system, comprising:

one or more processors;

one or more memory devices coupled to the one or more processors; and one or more computer readable storage devices coupled to the one or more processors, wherein the one or more storage devices contain program code executable by the one or more processors via the one or more memory devices to implement a method, the method comprising:

receiving, by the one or more processors of the computer system, information related to a temporal obstruction located within a first small cell of a network;

analyzing, by the one or more processors of the computer system, the information related to the temporal obstruction;

determining, by the one or more processors of the computer system, a change in a range of the first small cell caused by the temporal obstruction; and sending, by the one or more processors of the computer system, a notification related to the change in the range of the first small cell caused by the temporal obstruction, wherein the information received during the receiving is received from at least one information source, and wherein the analyzing further includes at least one of:

performing, by the one or more processors of the computer system, a cognitive search to identify at least one of a pattern, a trend or an actionable insight;

analyzing, by the one or more processors of the computer system, text using natural language analysis techniques to extract meta data from content; and analyzing, by the one or more processors of the computer system, an image and deriving categorizations or classifications of objects and scenes in the image.

9. The computer system of claim 8, the method further comprising:

determining, by the one or more processors of the computer system, that network service of a mobile device connected to the first small cell is impacted by the temporal obstruction, initiating, by the one or more processors of the computer system, a switch in the connection for the mobile device from the first small cell to a second small cell of the network in response to the determining that the network service of the mobile device connected to the first small cell is impacted by the temporal obstruction.

10. The computer system of claim 8, the method further comprising:

maintaining, by the one or more processors of the computer system, a small cell temporal obstruction range repository, wherein the small cell temporal obstruction range repository includes range information of a plurality of small cells in the network including the first small cell, the range information accounting for known temporal obstructions;

maintaining, by the one or more processors of the computer system, a small cell unobstructed range repository, wherein the small cell unobstructed range repository includes range information of the plurality of small cells in the network that does not account for known temporal obstructions;

comparing, by the one or more processors of the computer system, the small cell temporal obstruction range repository with the small cell unobstructed range repository.

11. The computer system of claim 8, the method further comprising:

receiving, by the one or more processors of the computer system, information related to a potential future temporal obstruction located within the network;

predicting, by the one or more processors of the computer system, the potential future temporal obstruction, from the information related to the potential future temporal obstruction; and sending, by the one or more processors of the computer system, a notification of the future temporal obstruction.

12. The computer system of claim 8, the method further comprising:

determining, by the one or more processors of the computer system, where a new small cell should be placed in the network to compensate for the change in the range of the first small cell caused by the temporal obstruction; and placing the new small cell in the network in response to the determining where the new small cell should be placed.

13. The computer system of claim 8, wherein the analyzing further includes at least one of:

determining, by the one or more processors of the computer system, a type of the temporal obstruction; and determining, by the one or more processors of the computer system, an expected duration of the temporal obstruction.

14. The computer system of claim 8, wherein the at least one information source selected from the group consisting of a social network, a web site, a forum, and a calendar application.

15. A computer program product, comprising a computer readable hardware storage device storing a computer readable program code, the computer readable program code comprising an algorithm that when executed by one or more processors of a computer system implements a method, the method comprising:

receiving, by the one or more processors of the computer system, information related to a temporal obstruction located within a first small cell of a network;

analyzing, by the one or more processors of the computer system, the information related to the temporal obstruction;

determining, by the one or more processors of the computer system, a change in a range of the first small cell caused by the temporal obstruction; and sending, by the one or more processors of the computer system, a notification related to the change in the range of the first small cell caused by the temporal obstruction, wherein the information received during the receiving is received from at least one information source, and wherein the analyzing further includes at least one of:

performing, by the one or more processors of the computer system, a cognitive search to identify at least one of a pattern, a trend or an actionable insight;

analyzing, by the one or more processors of the computer system, text using natural language analysis techniques to extract meta data from content; and analyzing, by the one or more processors of the computer system, an image and deriving categorizations or classifications of objects and scenes in the image.

16. The computer program product of claim 15, the method further comprising:

determining, by the one or more processors of the computer system, that network service of a mobile device connected to the first small cell is impacted by the temporal obstruction;

initiating, by the one or more processors of the computer system, a switch in the connection for the mobile device from the first small cell to a second small cell of the network in response to the determining that the network service of the mobile device connected to the first small cell is impacted by the temporal obstruction.

17. The computer program product of claim 15, the method further comprising:

maintaining, by the one or more processors of the computer system, a small cell temporal obstruction range repository, wherein the small cell temporal obstruction range repository includes range information of a plurality of small cells in the network including the first small cell, the range information accounting for known temporal obstructions;

maintaining, by the one or more processors of the computer system, a small cell unobstructed range repository, wherein the small cell unobstructed range repository includes range information of the plurality of small cells in the network that does not account for known temporal obstructions;

comparing, by the one or more processors of the computer system, the small cell temporal obstruction range repository with the small cell unobstructed range repository.

18. The computer program product of claim 15, the method further comprising:

receiving, by the one or more processors of the computer system, information related to a potential future temporal obstruction located within the network;

predicting, by the one or more processors of the computer system, the future temporal obstruction, from the information related to the potential future temporal obstruction; and sending, by the one or more processors of the computer system, a notification of the future temporal obstruction.

19. The computer program product of claim 15, the method further comprising:

determining, by the one or more processors of the computer system, where a new small cell should be placed in the network to compensate for the change in the range of the first small cell caused by the temporal obstruction; and placing the new small cell in the network in response to the determining where the new small cell should be placed.

20. The computer program product of claim 15, wherein the analyzing further includes at least one of:

determining, by the one or more processors of the computer system, a type of the temporal obstruction; and determining, by the one or more processors of the computer system, an expected duration of the temporal obstruction.

* * * * *